United States Patent
Yoneda et al.

(10) Patent No.: US 12,368,187 B2
(45) Date of Patent: Jul. 22, 2025

(54) SECONDARY BATTERY INCLUDING A WOUND ELECTRODE BODY WITH SPECIFIED FOIL BUNDLING

(71) Applicant: TOYOTA JIDOSHA KABUSHIKI KAISHA, Toyota (JP)

(72) Inventors: Koshiro Yoneda, Ichinomiya (JP); Fumihiko Ishiguro, Oobu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 275 days.

(21) Appl. No.: 17/106,263

(22) Filed: Nov. 30, 2020

(65) Prior Publication Data

US 2021/0218068 A1 Jul. 15, 2021

(30) Foreign Application Priority Data

Jan. 15, 2020 (JP) .................................. 2020-004448

(51) Int. Cl.
*H01M 10/05* (2010.01)
*H01M 4/66* (2006.01)
*H01M 10/0587* (2010.01)

(52) U.S. Cl.
CPC ......... *H01M 10/0587* (2013.01); *H01M 4/66* (2013.01)

(58) Field of Classification Search
None
See application file for complete search history.

(56) References Cited

U.S. PATENT DOCUMENTS

| 2010/0203371 A1* | 8/2010 | Nagai | H01M 10/0525 429/211 |
| 2015/0044533 A1* | 2/2015 | Tode | H01M 10/052 429/94 |
| 2016/0164133 A1 | 6/2016 | Matsumoto et al. | |
| 2018/0076424 A1 | 3/2018 | Kato | |

FOREIGN PATENT DOCUMENTS

| CN | 105702999 A | 6/2016 |
| CN | 107808975 A | 3/2018 |
| JP | 2002-008708 A | 1/2002 |
| JP | 2007-305322 A | 11/2007 |
| JP | 2009-026705 A | 2/2009 |
| KR | 10-2016-0070015 A | 6/2016 |
| KR | 10-2019-0058428 A | 5/2019 |
| WO | 2009/013592 A2 | 1/2009 |

* cited by examiner

*Primary Examiner* — Jonathan G Leong
*Assistant Examiner* — Tony S Chuo
(74) *Attorney, Agent, or Firm* — Oliff PLC

(57) ABSTRACT

A secondary battery has a flat-shaped wound electrode body and a rectangular battery case housing the wound electrode body. In the wound electrode body, in at least any one of a positive electrode current collection foil laminated part and a negative electrode current collection foil laminated part, a positive electrode current collection foil exposed portion or a negative electrode current collection foil exposed portion is foil-bundled at a foil-bundling position and joined to a positive electrode current collection terminal or a negative electrode current collection terminal. At the foil-bundling position, the thickness A of the wound electrode body in the lamination direction and the shortest distance B to the foil-bundling position from the vertex of the R portion closest to the foil-bundling position among R portions of the wound electrode body satisfy, $B \leq (1/2) A$.

8 Claims, 4 Drawing Sheets

WINDING AXIS DIRECTION

SECONDARY BATTERY INCLUDING A WOUND ELECTRODE BODY WITH SPECIFIED FOIL BUNDLING

CROSS-REFERENCE TO RELATED APPLICATION

This application claims priority to Japanese Patent Application No. 2020-004448 filed on Jan. 15, 2020, incorporated herein by reference in its entirety.

BACKGROUND

1. Technical Field

The present disclosure relates to a secondary battery. More specifically, the present disclosure relates to a secondary battery having a flat-shaped wound electrode body and a rectangular battery case housing the electrode body.

2. Description of Related Art

Since secondary batteries such as a lithium ion secondary battery (lithium secondary battery), a sodium ion secondary battery, and a nickel hydrogen battery are lighter in weight and have higher energy density than existing batteries, the secondary batteries are used as a so-called portable power source of personal computers and mobile terminals and as a battery for driving a vehicle. In particular, the lithium ion secondary battery, which is lightweight and has a high energy density, is preferably used as a high output power source for driving vehicles such as an electric vehicle (EV), a hybrid vehicle (HV), and a plug-in hybrid vehicle (PHV).

As one configuration of this type of secondary battery, a configuration including an electrode body having a positive or negative electrode laminate structure in which a sheet-shaped positive electrode (hereinafter, may be referred to as "positive electrode sheet") having a positive electrode active material layer that is formed on a positive electrode current collection foil and a sheet-shaped negative electrode (hereinafter, may be referred to as "negative electrode sheet") having a negative electrode active material layer that is formed on a negative electrode current collection foil are alternatively overlapped multiply while a separator is interposed between the positive electrode and the negative electrode is mentioned. For example, a so-called wound electrode body in which an elongated positive electrode sheet and a similarly an elongated negative electrode sheet are overlapped while a separator is interposed therebetween, wound in the longitudinal direction, and formed into a flat shape is a typical example of an electrode body having the positive or negative electrode laminate structure (see Japanese Unexamined Patent Application Publication No. 2007-305322 (JP 2007-305322 A).

In such a wound electrode body described above, in the winding axis direction of the wound electrode body, a positive electrode current collection foil laminated part that is configured such that an active material layer non-forming portion (hereinafter, also referred to as a "positive electrode current collection foil exposed portion") of each of the laminated positive electrode sheets is multiply overlapped is present at one end portion of the main body portion of the wound electrode body (that is, a laminate structure portion of a positive or negative electrode, in other words, refers to a portion in which a positive or negative electrode active material layer forming portion is formed while facing each other) in the winding axis direction of the wound electrode body. Similarly, a negative electrode current collection foil laminated part that is configured such that an active material layer non-forming portion (hereinafter, also referred to as a "negative electrode current collection foil exposed portion") of each of the laminated negative electrode sheets is multiply overlapped is present at the other end portion of the main body portion. Further, each current collection structure of the positive or negative electrode is formed by bundling the current collection foil laminated part (hereinafter, also referred to as "foil-bundling"), arranging a part of the current collection terminal of the corresponding electrode, and joining them by welding means such as ultrasonic welding.

SUMMARY

As a secondary battery has a high output and energy density, various contrivances (for example, thinning of the current collection foil and reduction of the length of the current collection foil exposed portion of the current collection foil in the winding axis direction) have been made to reduce the volume of the non-storage battery component such as a current collection foil in order to increase the volume of the main body portion of the electrode body housed inside the battery case having a predetermined volume. However, for example, in the wound electrode body that has been devised as described above, of the two current collection foils constituting an outer surface of both ends of the current collection foil laminated parts in the lamination direction, an angled portion (that is, a stress concentrated portion in which a high surface pressure is generated) may be generated between the space from the boundary line of an active material layer forming portion of one current collection foil present at the position relatively far from the foil-bundling position to an end portion of the other current collection foil facing the one current collection foil, due to the foil-bundling position of the current collection foil laminated part. As a result, the internal resistance in the battery may increase due to damage to the separator adjacent to the one current collection foil.

As a secondary battery has a high output and energy density, an object of the present disclosure is to provide a secondary battery having a wound electrode body in which a current collection foil is thinned and the length of a current collection foil exposed portion in the winding axis direction is reduced.

In an aspect of the present disclosure, a secondary battery includes a wound electrode body, a positive electrode current collection terminal, a negative electrode current collection terminal, and a case that houses the wound electrode body. The wound electrode body is formed in a flat shape, in which a positive electrode and a negative electrode are wound in the longitudinal direction after being overlapped a plurality of times while a separator is interposed therebetween. The positive electrode is a sheet-shaped member in which a positive electrode active material layer is formed on an elongated positive electrode current collection foil, and the negative electrode is a sheet-shaped member in which a negative electrode active material layer is formed on an elongated negative electrode current collection foil. The positive electrode current collection terminal is joined to the positive electrode of the wound electrode body, and the negative electrode current collection terminal is joined to the negative electrode of the wound electrode body. The case has a rectangular prismatic shape having a rectangular wide-width surface. The wound electrode body disclosed herein includes a positive electrode active material layer laminated portion in which a positive electrode active material layer is laminated and a negative electrode active material layer laminated portion in which a negative electrode active material layer is laminated. A positive electrode current collection foil laminated part is arranged at one of both end portions of the positive electrode active material layer laminated portion and the negative electrode active material layer laminated portion in a winding axis direction. The positive electrode current collection foil laminated part is laminated in a state where a positive electrode current collection foil exposed portion of the positive electrode current collection foil, in which the positive electrode active material layer is not formed, is protruded from the negative electrode. A negative electrode current collection foil laminated part is arranged at the other of the both end portions of the positive electrode active material layer laminated portion and the negative electrode active material layer laminated portion in the winding axis direction. The negative electrode current collection foil laminated part is laminated in a state where a negative electrode current collection foil exposed portion of the negative electrode current collection foil, in which the negative electrode active material layer is not formed, is protruded from the positive electrode. In at least any one of the positive electrode current collection foil laminated part and the negative electrode current collection foil laminated part, the positive electrode current collection foil exposed portion or the negative electrode current collection foil exposed portion is foil-bundled at a foil-bundling position. The positive electrode current collection foil exposed portion or the negative electrode current collection foil exposed portion, each of which has been foil-bundled at the foil-bundling position, is joined to the positive electrode current collection terminal or the negative electrode current collection terminal. Further, in a case where the thickness of the wound electrode body in the lamination direction is denoted by A, and the shortest distance to the foil-bundling position from the vertex of the R portion closest to the foil-bundling position among R portions of the wound electrode body is denoted by B, the foil-bundling position described above satisfies, B≤(1/2) A.

According to the above aspect, of the two current collection foils constituting an outer surface in both ends of the current collection foil laminated parts of the positive electrode and negative electrode in the lamination direction, an angled portion (that is, a stress concentrated portion in which a high surface pressure is generated) is unlikely to be generated between the boundary line of an active material layer forming portion of one current collection foil present at the position relatively far from the foil-bundling position and an end of the other current collection foil facing the one current collection foil. Thus the possibility that the separator adjacent to the one current collection foil is damaged is reduced. As a result, the increase in internal resistance in the battery can be reduced.

In the above aspect, the angle (hereinafter, also referred to as "foil-bundling angle") between the first current collection foil which has been bundled and the plane direction (that is, the direction orthogonal to the lamination direction of the positive electrode and the negative electrode) of the laminated positive electrode or negative electrode may be less than 40°. The first current collection foil 60 is a current collection foil present at the position relatively farthest from the foil-bundling position of the two current collection foils constituting the outer surface of both the ends of the positive electrode current collection foil laminated part or the negative electrode current collection foil laminated part in the lamination direction. As described above, in a case where the foil-bundling angle is 40° or less as described above, the angled portion is further difficult to be generated, and the possibility that the separator adjacent to the current collection foil is damaged is suitably reduced. As a result, the increase in internal resistance in the battery can be suitably reduced.

In the above aspect, in a case where the shortest distance between the foil-bundling position and the boundary line of the positive electrode active material layer laminated portion or negative electrode active material layer laminated portion in the winding axis direction is denoted by C, C≥(1/3) A may be satisfied. Since the foil-bundling angle is reduced by defining the distance C as described above, the angled portion is difficult to be generated, and the possibility that the separator adjacent to the current collection foil is damaged is further suitably reduced. As a result, the increase in internal resistance in the battery can be further suitably reduced. In addition, the distance C may satisfy C≥(1/2) A.

In the above aspect, the foil-bundling position may be present in the positive electrode current collection foil laminated part. Generally, a positive electrode sheet (positive electrode) is made larger than a negative electrode sheet (negative electrode). For this reason, of the two current collection foils constituting the outer surface of both the ends of the positive electrode current collection foil laminated part in the lamination direction, in a case where the angled portion is generated when one current collection foil present at the position relatively farthest from the foil-bundling position is foil-bundled, a separator adjacent to the other current collection foil interferes with the end portion of the negative electrode in the vicinity of the current collection foil, and thus the separator may be greatly damaged. Accordingly, in a case where the foil-bundling position is provided in the positive electrode current collection foil laminated part, the effects of the present disclosure can be suitably exhibited.

In the above aspect, the positive electrode current collection foil exposed portion and the positive electrode current collection terminal, or the negative electrode current collection foil exposed portion and the negative electrode current collection terminal may be joined by ultrasonic welding. The ultrasonic welding is a joining method characterized by sandwiching the current collection foil laminated part and the corresponding current collection terminal of the electrode with are a horn and an anvil of an ultrasonic welding device, and welding the sandwiched current collection foil laminated part and corresponding current collection terminal by applying a pushing load from the horn in the anvil direction while applying vibration. However, in a case where the vibration is applied to the angled portion, the separator adjacent to the current collection foil may be greatly damaged. For this reason, in a case where ultrasonic welding is performed at the time of joining the current collection terminal, the effects of the present disclosure can be suitably exhibited.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings. In the following drawings, the same reference signs are given to the members and sites from which the same actions are obtained, for description. Further, the dimensional relationships (for example, length, width, and thickness) in each drawing do not reflect the actual dimensional relationships. It is noted that matters other than matters particularly referred to in the present specification and necessary for carrying out the present disclosure (for example, a general configuration and manufacturing process of the entire secondary battery that does not characterize the present disclosure) may be understood as a design matter for those skilled in the art based on the related art in the related field. The present disclosure can be carried out based on the contents disclosed in the present specification and the common general technical knowledge in the field.

In the present specification, the term "secondary battery" refers to a general electricity storage device that can be repeatedly charged and discharged. Hereinafter, as an example of the secondary battery disclosed herein, a rectangular lithium ion secondary battery having a flat-shaped wound electrode body is described as an example. However, the following description is not intended to limit the present disclosure to the lithium ion secondary battery. For example, a so-called storage battery (that is, a chemical battery) such as a nickel hydrogen battery or a nickel cadmium battery, or an electric double layer capacitor (that is, a physical battery) is also included.

Figure 1:
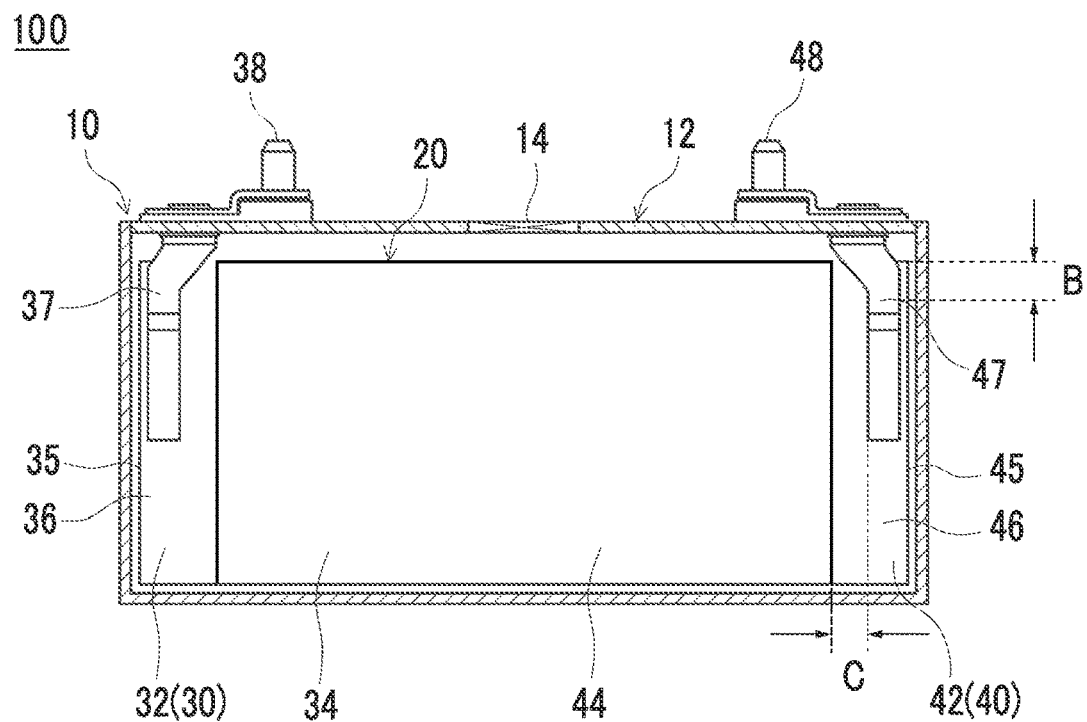
FIG. 1 is a cross-sectional view schematically illustrating an outer shape and an internal configuration of a lithium ion secondary battery according to one embodiment.

A lithium ion secondary battery 100 illustrated in FIG. 1 is constructed by housing a flat-shaped wound electrode body 20 and an electrolytic solution (not shown) in a rectangular battery case (that is, an outer container) 10. In a lid 12 of the battery case 10, a positive electrode external terminal 38 and a negative electrode external terminal 48 for external connection, a thin safety valve 14 set to release an internal pressure of the battery case 10 when the internal pressure rises above a predetermined level, and an injection port (not shown) for injecting the electrolytic solution is provided. Parts of the external terminals 38 and 48 are respectively connected to the positive electrode current collection terminal 37 and the negative electrode current collection terminal 47, at the inside of the case. As a material for the battery case 10, for example, a lightweight and highly heat-conductive metal material such as aluminum is used.

Details of B and C, which are parameters involved in defining the foil-bundling position, will be described later.

Figure 2:
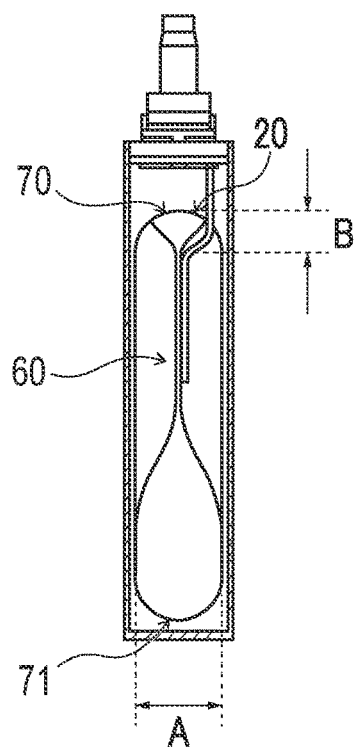
FIG. 2 is a side cross-sectional view schematically illustrating the inside of a lithium ion secondary battery according to one embodiment.
Figure 3:
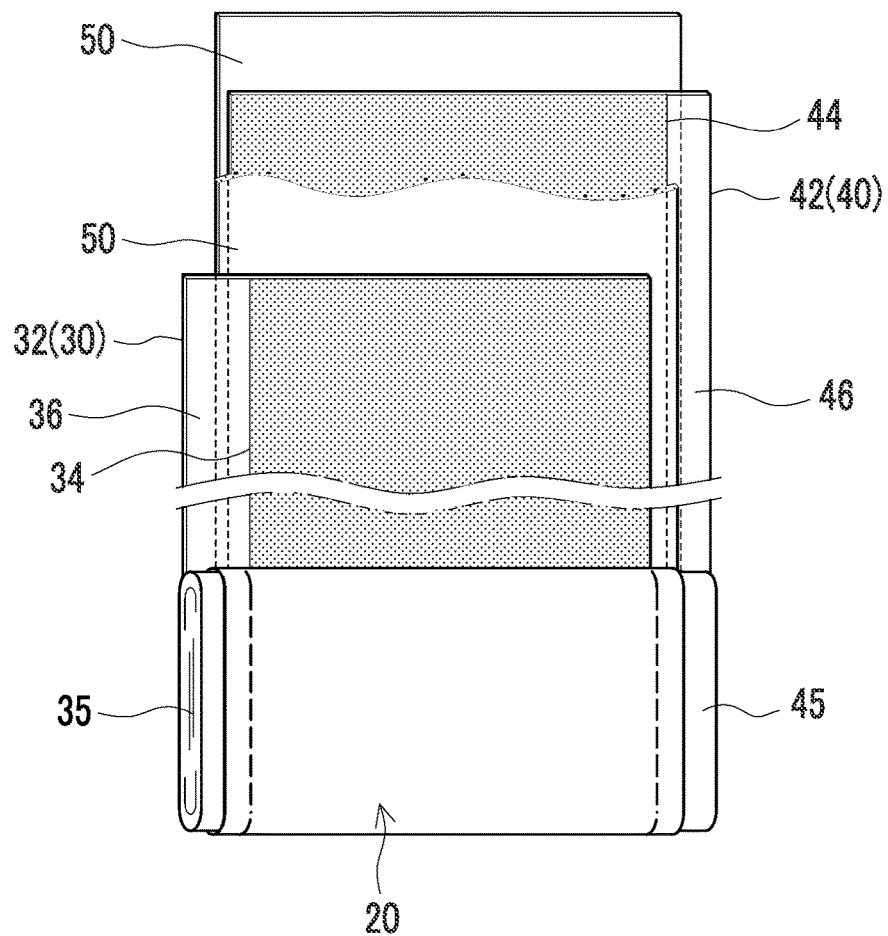
FIG. 3 is a perspective view schematically illustrating a wound electrode body according to one embodiment.

As illustrated in FIG. 3, the wound electrode body 20 has a configuration in which a positive electrode sheet 30 having a positive electrode active material layer 34 which is formed on one surface or both surfaces (in FIG. 3, both surfaces) of an elongated positive electrode current collection foil 32 along the longitudinal direction and a negative electrode sheet 40 having a negative electrode active material layer 44 which is formed on one surface or both surfaces (in FIG. 3, both surfaces) of an elongated negative electrode current collection foil 42 along the longitudinal direction are wound in the longitudinal direction after being overlapped while two separators 50 interposed therebetween. Further, the positive electrode current collection terminal 37 and the negative electrode current collection terminal 47 are respectively joined to a positive electrode current collection foil laminated part 35 in which a positive electrode current collection foil exposed portion 36 (that is, a portion in which the positive electrode current collection foil 32 is exposed without forming the positive electrode active material layer 34) is laminated and a negative electrode current collection foil laminated part 45 in which a negative electrode current collection foil exposed portion 46 (that is, a portion in which the negative electrode current collection foil 42 is exposed without forming the negative electrode active material layer 44) is laminated, where the positive electrode current collection foil exposed portion 36 and the negative electrode current collection foil exposed portion 46 are formed so as to be respectively protruded outside of both ends of the wound electrode body 20 in the winding axis direction. As illustrated in FIG. 2, the above-described joining is performed by foil-bundling the positive or negative electrode current collection foil laminated part (the positive electrode current collection foil laminated part 35 or the negative electrode current collection foil laminated part 45) at a predetermined foil-bundling position, followed by arranging a part of the corresponding electrode of the current collection terminal (the positive electrode current collection terminal 37 or the negative electrode current collection terminal 47) and joining the arranged part by the welding means such as ultrasonic welding. Details A, which is a parameter involved in defining the foil-bundling position, will be described later. Here, "foil-bundling" refers to bundling the current collection foil laminated part, and "foil-bundling position" refers to a position in which the current collection foil laminated part is bundled.

For the positive electrode sheet 30 and the negative electrode sheet 40, the same materials as those used in the related art of the lithium ion secondary battery can be used without particular limitation. One typical aspect is described below.

An example of the positive electrode current collection foil 32 constituting the positive electrode sheet 30 include an aluminum foil. Examples of the positive electrode active material included in the positive electrode active material layer 34 include a lithium transition metal oxide (for example, $LiNi_{1/3}Co_{1/3}Mn_{1/3}O_2$, $LiNiO_2$, $LiCoO_2$, $LiFeO_2$, $LiMn_2O_4$, and $LiNi_{0.5}Mn_{1.5}O_4$) and a lithium transition metal phosphate compound (for example, $LiFePO_4$). The positive electrode active material layer 34 may include components other than the active material, such as a conductive material and a binder. As the conductive material, for example, carbon black such as acetylene black (AB) or other carbon materials (for example, graphite) can be suitably used. As the binder, for example, polyvinylidene fluoride (PVDF) can be used.

An example of the negative electrode current collection foil 42 constituting the negative electrode sheet 40 includes a copper foil. As the negative electrode active material included in the negative electrode active material layer 44, for example, carbon materials such as graphite, hard carbon, and soft carbon can be used. Among them, graphite is preferred. The graphite may be natural graphite or artificial graphite, and may be covered with an amorphous carbon material. The negative electrode active material layer 44 may include components other than the active material, such as a binder and a viscosity improver. As the binder, for example, styrene-butadiene rubber (SBR) may be used. As the viscosity improver, for example, carboxymethyl cellulose (CMC) may be used.

As the separator 50, a porous sheet (film) made of polyolefins such as polyethylene (PE) and polypropylene (PP) may be suitably used. The porous sheet may have a single-layer structure or a laminated structure of two or more layers (for example, a three-layer structure in which PP layers are laminated on both surfaces of a PE layer). A heat resistant layer (HRL) may be provided on the surface of the separator 50. The air permeability of the separator 50, which is measured by the Gurley test method, is not particularly limited but is preferably 350 seconds/100 cc or less.

The electrolytic solution included in the lithium ion secondary battery disclosed herein usually contains a non-aqueous solvent and a supporting electrolyte. For the non-aqueous solvent, a known one used as a non-aqueous solvent for a lithium ion secondary battery electrolytic solution can be used, and specific examples thereof include a carbonate, an ether, an ester, a nitrile, a sulfone, and a lactone. Among them, a carbonate is preferred. Examples of the carbonate include ethylene carbonate (EC), propylene carbonate (PC), diethyl carbonate (DEC), dimethyl carbonate (DMC), and ethyl methyl carbonate (EMC). These may be used alone or in a combination of two or more thereof.

In addition, as the supporting electrolyte, a known supporting electrolyte used as a supporting electrolyte of an electrolytic solution for a lithium ion secondary battery can be used, and specific examples thereof include $LiPF_6$, $LiBF_4$, and lithium bis(fluorosulfonyl)imide (LiFSI) and lithium bis(trifluoromethane)sulfonimide (LiTFSI). The concentration of the supporting electrolyte in the electrolytic solution is not particularly limited, but is, for example, 0.5 mol/L or more and 5 mol/L or less, preferably 0.7 mol/L or more and 2.5 mol/L or less, and more preferably 0.7 mol/L or more and 1.5 mol/L or less.

The electrolytic solution may contain other components as long as the effects of the present disclosure are not significantly impaired. Examples of the other components include gas generating agents such as biphenyl (BP) and cyclohexylbenzene (CHB); a film forming agent; a dispersant; and a viscosity improver.

The method for preparing the above-described electrolytic solution may be a conventionally known method, and the above-described electrolytic solution can be used for a lithium ion secondary battery according to a known method. Further, the lithium ion secondary battery disclosed here can be manufactured by a conventionally known method. Since the present disclosure relates to the foil-bundling position in the current collection foil laminated part, detailed descriptions of the methods therefor will be omitted.

Figure 4:
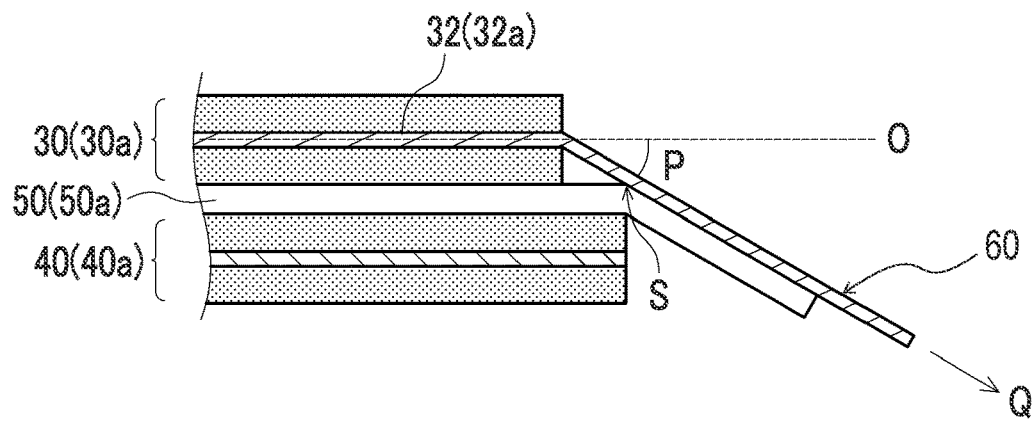
FIG. 4 is a schematic view illustrating an aspect of foil-bundling of a positive electrode current collection foil laminated part according to the one embodiment.

In the lithium ion secondary battery 100 disclosed herein, in a case where the thickness of the wound electrode body 20 in the lamination direction is denoted by A, and the shortest distance to the foil-bundling position from the vertex of the R portion 70 closest to the foil-bundling position among R portions 70, 71 of the electrode body is denoted by B, the foil-bundling position illustrated in FIG. 1 satisfies, $B \leq (1/2) A$. Hereinafter, the effects of the present disclosure will be described with reference to FIG. 4 which is a schematic view illustrating an aspect of foil-bundling the positive electrode current collection foil laminated part, but it is not intended that the practice of the present disclosure be limited to the positive electrode current collection foil laminated part. In a case where A and B are defined as described above, of the two current collection foils constituting the outer surface of both the ends of the positive electrode current collection foil laminated part in the lamination direction, one positive electrode current collection foil present at a position relatively far from the foil-bundling position is denoted by 32a as illustrated in FIG. 4, an angled portion (that is, a stress concentrated portion in which a high surface pressure is generated) is difficult to be generated between the space from the boundary line of an active material layer forming portion of the positive electrode current collection foil 32 to an end portion of the other the current collection foil facing the positive electrode current collection foil 32. As a result, the possibility that the separator 50a adjacent to the one current collection foil is damaged is reduced. Accordingly, the increase in internal resistance in the battery can be reduced.

In addition, the foil-bundling angle P illustrated in FIG. 4 (that is, the angle between the plane direction O of the positive electrode 30a and the foil-bundling direction Q) is preferably 40° or less. In FIG. 4, the angle P between a current collection foil 32a present at a position relatively far from the foil-bundling position of two current collection foils constituting an outer surface of both end portions of the positive electrode current collection foil laminated part 35, and the plane direction O of the positive electrode 30a is 40° or less. As described will be later in detail, in a case where the foil-bundling angle P is 40° or less, the angled portion is difficult to be generated, and thus the possibility that the separator 50a is damaged is suitably reduced. As a result, the increase in internal resistance in the battery can be suitably reduced.

In addition, the shortest distance between the foil-bundling position and the boundary line of the active material layer laminated portion of the same electrode in the winding axis direction is denoted by C. At this time, it is preferable that the thickness A, the distance B, and the distance C satisfy $C \geq (1/3) A$ while satisfying $B \leq (1/2) A$. In this case, the foil-bundling angle P is reduced, the angled portion is difficult to be generated, and thus the possibility that the separator 50a is damaged is suitably reduced. As a result, the increase in internal resistance in the battery can be further suitably reduced. In addition, the distance C more preferably satisfies $C \geq (1/2) A$.

In addition, in a case where the current collection terminal (the positive electrode current collection terminal 37 or the negative electrode current collection terminal 47) are joined by ultrasonic welding, the effects of the present disclosure can be suitably exhibited. For example, in the ultrasonic welding of the positive electrode, the welding is performed by sandwiching the positive electrode current collection foil laminated part and the positive electrode current collection terminal of the electrode with a horn and an anvil of an ultrasonic welding device, and welding the sandwiched positive electrode current collection foil laminated part and positive electrode current collection terminal while applying a pushing load from the horn in the anvil direction while applying vibration. However, in a case where the vibration is applied to the angled portion generated in the positive electrode current collection foil 32a, the separator 50a adjacent to the positive electrode current collection foil 32a may be greatly damaged. For this reason, in a case where the current collection terminal is joined by ultrasonic welding, the effects of the present disclosure can be suitably exhibited.

In addition, since the positive electrode sheet (positive electrode) is made larger than the negative electrode sheet (negative electrode), in a case where the angled portion is generated when the positive electrode current collection foil 32a is foil-bundled, the separator 50a interferes with the end portion of the negative electrode 40a in the vicinity of the separator 50a, and thus the separator 50a may be greatly damaged. Accordingly, in a case where the foil-bundling position is provided in the positive electrode current collection foil laminated part, the effects of the present disclosure can be suitably exhibited.

Hereinafter, test results of an evaluation test using a lithium ion secondary battery as one example of the secondary battery disclosed herein will be described with reference to FIG. 4 to FIG. 7.

Production of Lithium Ion Secondary Battery for Evaluation

A lithium nickel cobalt manganese composite oxide as a positive electrode active material powder, acetylene black (AB) as a conductive material, and polyvinylidene fluoride (PVdF) as a binder were prepared. The lithium nickel cobalt manganese composite oxide, AB, and PVdF were with N-methylpyrrolidone (NMP) to prepare a slurry for forming a positive electrode active material layer. A positive electrode sheet was produced by applying the slurry to an aluminum foil and then drying the applied slurry. A natural graphite-based carbon material (C) as a negative electrode active material, styrene butadiene rubber (SBR) as a binder, and carboxymethyl cellulose (CMC) as a viscosity improver were prepared. These were mixed with ion exchange water in the mass ratio of C:SBR:CMC=98:1:1 to prepare a slurry for forming a negative electrode active material layer. A negative electrode sheet was produced by applying the slurry to a copper foil and then drying the applied slurry. As a separator, a polyolefin porous film having a three-layer structure of PP/PE/PP was prepared. For producing a non-aqueous electrolytic solution, a mixed solvent containing ethylene carbonate (EC), dimethyl carbonate (DMC), and ethyl methyl carbonate (EMC) in the volume ratio of 30:40:30 was prepared. Then, $LiPF_6$ as a supporting electrolyte was dissolved in the mixed solvent at a concentration of 1.0 mol/L. The positive electrode sheet and the negative electrode sheet produced as described above were wound a plurality of times while the separator was interposed therebetween and then formed into a flat shape to produce a wound electrode body. After being attached to a current collection terminal, the electrode body was housed together with the electrolytic solution and sealed in a rectangular battery case. In this manner, a lithium ion secondary battery for evaluation was produced. For performing the present evaluation test, two types of lithium ion secondary batteries each having a thickness A of the electrode body of 11.4 mm and 25.4 mm in the lamination direction were produced.

Measuring Method for Foil-Bundling Angle

Here, the "foil-bundling angle" refers to a foil-bundling angle P (see FIG. 4). The foil-bundling angle P was calculated by foil-bundling a positive electrode current collection foil laminated part at a predetermined foil-bundling position, followed by scanning an aspect of the foil-bundling with a 3D scanner manufactured by Keyence Corporation and performing data analysis. The measurement was performed according to the attached manual.

Measuring Method for Surface Pressure Applied to Separator

Here, the "surface pressure applied to separator" refers to surface pressure applied to a separator 50a at S in FIG. 4. The surface pressure was measured using a tactile sensor manufactured by Nitta Corporation, after foil-bundling the positive electrode current collection foil laminated part at a predetermined foil-bundling position. The measurement was performed according to the attached manual.

Measuring Method for Scratch depth on Separator

Here, "scratch depth on separator" refers to a scratch depth generated on the separator 50a when the surface pressure is applied to the separator 50a at the S of FIG. 4. The scratch depth was measured using a laser microscope manufactured by Keyence Corporation, after foil-bundling the positive electrode current collection foil laminated part at a predetermined foil-bundling position. The measurement was performed according to the attached manual.

Figure 5:
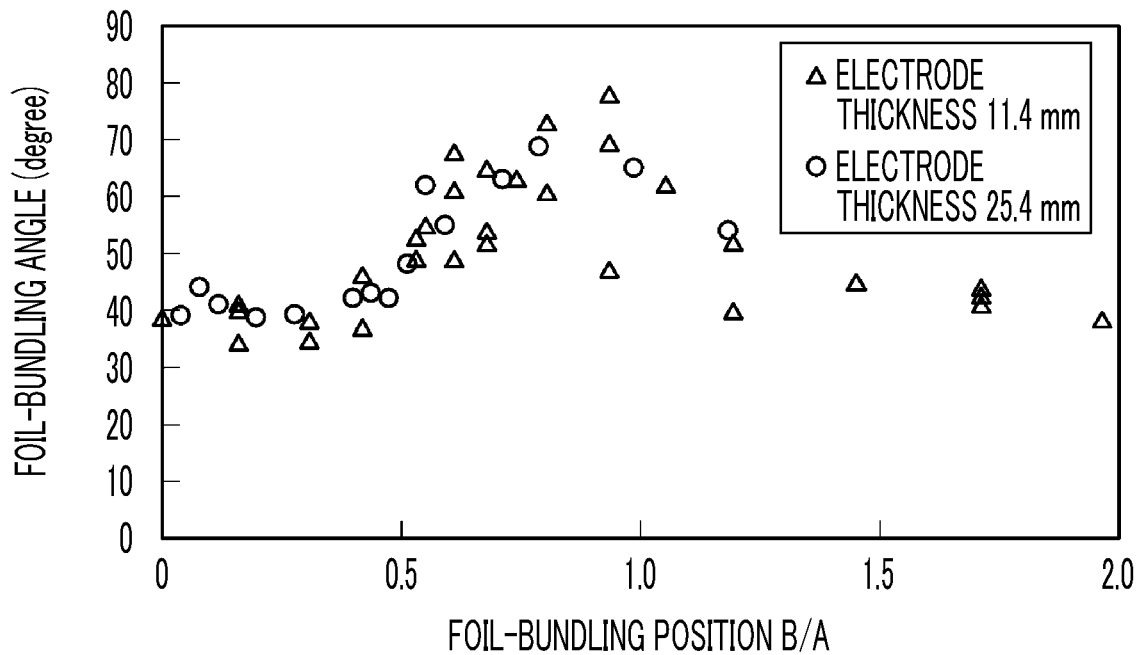
FIG. 5 is a graph showing a relationship between a foil-bundling position (B/A) and a foil-bundling angle (degree) of the positive electrode current collection foil laminated part in FIG. 4.

The graph of FIG. 5 shows the relationship between the foil-bundling position (defined by B/A) and the foil-bundling angle P (degree) in two types of lithium ion secondary batteries each having an A of 11.4 mm and 25.4 mm. From FIG. 5, it has been confirmed that the foil-bundling angle P is around 40° (hereinafter, "around 40°" means 35° to 45°) in the range which satisfies $B/A \leq 1/2$, that is, $B \leq (1/2) A$ in a case where the A is 11.4 mm. It has been also confirmed that the foil-bundling angle P is 50° to 70° in the range which satisfies $1/2 < B/A < 1$, that is, $(1/2) A < B < A$. Similar results were also obtained in a case where the A was 25.4 mm.

Figure 6:
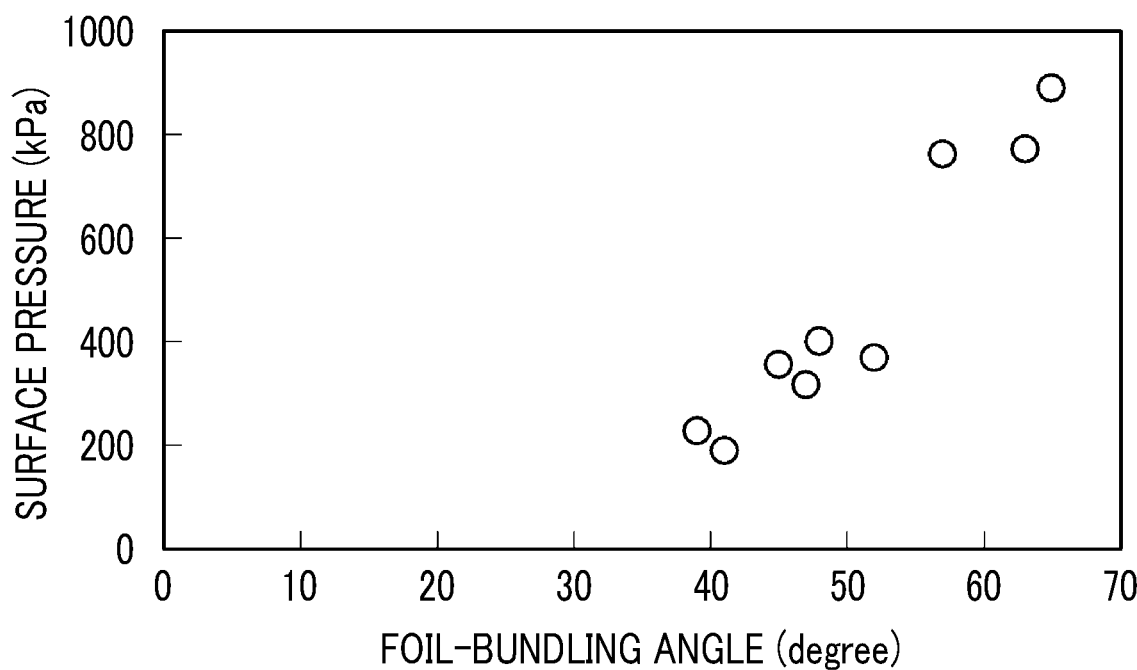
FIG. 6 is a graph showing a relationship between the foil-bundling angle in FIG. 4 and a surface pressure applied to a separator.
Figure 7:
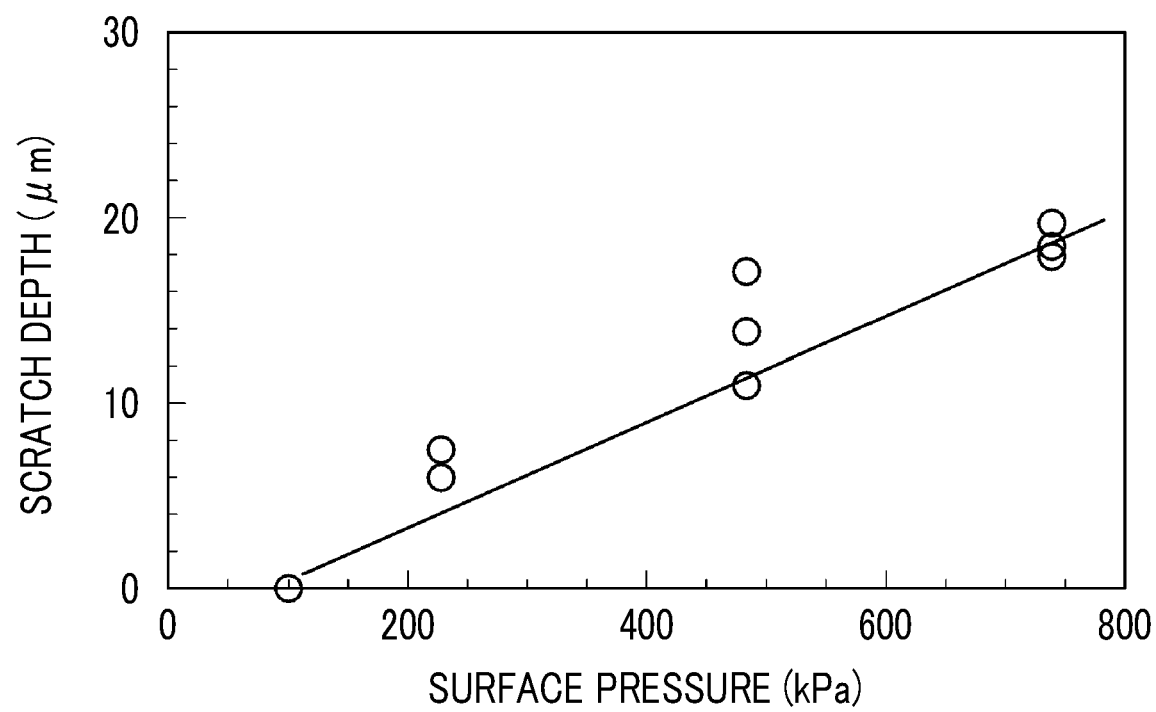
FIG. 7 is a graph showing a relationship between a change of the surface pressure applied to the separator when the foil-bundling angle is changed, and a change of a depth of a scratch generated in the separator.

FIG. 6 and FIG. 7 relate to a lithium ion secondary battery having an A of 11.4 mm. In the graph of FIG. 6, the relationship between the foil-bundling angle P and the surface pressure applied to the separator 50a at the S is shown. In the graph of FIG. 7, the relationship between the surface pressure applied to the separator 50a at the S and the scratch depth generated in the separator 50a by the surface pressure is shown. From the FIG. 6 and FIG. 7, it has been confirmed that in a case where the foil-bundling angle P is around 40°, the surface pressure applied to the separator 50a at the S is less than 300 kPa, and the scratch depth generated in the separator 50a is less than 6 μm (In a case where the scratch depth exceeds 8 μm, the internal resistance in the battery may increase, which is not preferable). Further, it has been confirmed that in a case where the foil-bundling angle P is 50° to 70°, the surface pressure applied to the separator 50a at the S exceeds 500 kPa, and the scratch depth generated in the separator 50a greatly exceeds 8 μm.

From the above results, it can be seen that in a case where the range of $B/A \leq 1/2$ is satisfied, the foil-bundling angle P is around 40°, whereby the angled portion is difficult to be generated, and thus the surface pressure applied to the separator 50a at the S is decreased. As a result, the possibility that the separator 50a is damaged is reduced, and thus an increase in the internal resistance in the battery can be suppressed. In addition, it can be seen that the above-described effects of the present disclosure are suitably exhibited regardless of the magnitude of the thickness A of the wound electrode body.

Further, it can be seen that since the possibility that the separator 50a is damaged is suitably reduced in a case where the foil-bundling angle is around 40°, a reliable secondary battery in which the increase in the internal resistance is suitably suppressed can be obtained in a case where the foil-bundling angle is defined to be 40° or less.

Specific examples of the present disclosure have been described in detail as above, but these are merely examples and do not limit the scope of CLAIMS. The technology described in the scope of CLAIMS includes various modifications and changes of the specific examples exemplified above.

The lithium ion secondary battery configured as described above can be used for various applications. A suitable application thereof includes a driving power source mounted in vehicles such as an electric vehicle (EV), a hybrid vehicle (HV), and a plug-in hybrid vehicle (PHV).

What is claimed is:

1. A secondary battery comprising:
a wound electrode body formed in a flat shape, in which a positive electrode and a negative electrode are wound in a longitudinal direction after being overlapped a plurality of times while a separator is interposed therebetween, the positive electrode being a sheet -shaped member in which a positive electrode active material layer is formed on an elongated positive electrode current collection foil and the negative electrode being a sheet-shaped member in which a negative electrode current collection foil is formed on an elongated negative electrode active material layer;
a positive electrode current collection terminal joined to the positive electrode of the wound electrode body;
a negative electrode current collection terminal joined to the negative electrode of the wound electrode body; and
a battery case housing the wound electrode body, the battery case having a rectangular prismatic shape and a rectangular wide-width surface, wherein
the wound electrode body includes
a positive electrode active material layer laminated portion in which the positive electrode active material layer is laminated,
a negative electrode active material layer laminated portion in which the negative electrode active material layer is laminated,
a positive electrode current collection foil laminated part arranged at one of both end portions of the positive electrode active material layer laminated portion and the negative electrode active material layer laminated portion in a winding axis direction, the positive electrode current collection foil laminated part being laminated in a state where a positive electrode current collection foil exposed portion of the positive electrode current collection foil is protruded from the negative electrode, and the positive electrode current collection foil exposed portion being a portion in which the positive electrode active material layer is not formed, and
a negative electrode current collection foil laminated part arranged at the other of the both end portions of the positive electrode active material layer laminated portion and the negative electrode active material layer laminated portion in the winding axis direction, the negative electrode current collection foil laminated part being laminated in a state where a negative electrode current collection foil exposed portion of the negative electrode current collection foil is protruded from the positive electrode, and the negative electrode current collection foil exposed portion being a portion in which the negative electrode active material layer is not formed,
a foil-bundling position is provided in the positive electrode current collection foil laminated part,
the positive electrode current collection foil exposed portion is foil-bundled at the foil-bundling position, and the positive electrode current collection foil exposed portion which has been foil-bundled at the foil-bundling position is joined to the positive electrode current collection terminal;
the separator is adjacent to part of the positive electrode current collection foil exposed portion;
the positive electrode current collection foil exposed portion that is laminated is joined to the positive electrode current collection terminal in a continuous manner along the lamination direction, or the negative electrode current collection foil exposed portion that is laminated is joined to the negative electrode current collection terminal in a continuous manner along the lamination direction; and
in a case where a thickness of the wound electrode body in a lamination direction is denoted by A, and a shortest distance to the foil-bundling position from a vertex of an R portion closest to the foil-bundling position among R portions of the wound electrode body is denoted by B, the foil-bundling position satisfies, B≤(1/2) A,
wherein an angle between a first current collection foil which has been foil-bundled and a plane direction of the laminated positive electrode or the laminated negative electrode is 35° or more and 40° or less and a scratch depth generated in the separator is less than 6 µm,
wherein the first current collection foil is a current collection foil present at a position farthest from the foil-bundling position of two current collection foils constituting an outer surface of both end portions of the positive electrode current collection foil laminated part or the negative electrode current collection foil laminated part in the lamination direction, and
wherein in a case where a shortest distance between the foil-bundling position and a boundary line of the positive electrode active material layer laminated portion or the negative electrode active material layer laminated portion in the winding axis direction is denoted by C, C≥(1/3) A is satisfied.

2. The secondary battery according to claim 1, wherein the foil -bundling position is present in the positive electrode current collection foil laminated part.

3. The secondary battery according to claim 1, wherein the positive electrode current collection foil exposed portion and the positive electrode current collection terminal, or the negative electrode current collection foil exposed portion and the negative electrode current collection terminal, are joined by ultrasonic welding.

4. The secondary battery according to claim 1, wherein the thickness of the wound electrode body in a lamination direction A is 11.4 mm.

5. The secondary battery according to claim 1, wherein the angle between the first current collection foil which has been foil-bundled and the plane direction of the laminated positive electrode or the laminated negative electrode is about 40°.

6. The secondary battery according to claim 1, wherein the negative electrode active material layer includes graphite.

7. The secondary battery according to claim 1, wherein a heat resistant layer is provided on a surface of the separator.

8. The secondary battery according to claim 1, wherein the separator has an air permeability of 350 seconds/100 cc or less.

* * * * *